United States Patent
Shim

(10) Patent No.: US 11,787,159 B2
(45) Date of Patent: Oct. 17, 2023

(54) METHOD TO PROCESS A CERAMIC MATRIX COMPOSITE (CMC) WITH A PROTECTIVE CERAMIC COATING

(71) Applicant: Rolls-Royce High Temperature Composites Inc., Cypress, CA (US)

(72) Inventor: Sungbo Shim, Irvine, CA (US)

(73) Assignee: ROLLS-ROYCE HIGH TEMPERATURE COMPOSITES INC., Cypress, CA (US)

( * ) Notice: Subject to any disclaimer, the term of this patent is extended or adjusted under 35 U.S.C. 154(b) by 197 days.

(21) Appl. No.: 17/229,154

(22) Filed: Apr. 13, 2021

(65) Prior Publication Data

US 2021/0230071 A1 Jul. 29, 2021

Related U.S. Application Data

(62) Division of application No. 15/956,097, filed on Apr. 18, 2018, now Pat. No. 11,001,532.
(Continued)

(51) Int. Cl.
*B32B 18/00* (2006.01)
*C04B 41/00* (2006.01)
(Continued)

(52) U.S. Cl.
CPC ............ *B32B 18/00* (2013.01); *C04B 35/515* (2013.01); *C04B 35/52* (2013.01); *C04B 35/565* (2013.01);
(Continued)

(58) Field of Classification Search
CPC .................................................. C04B 35/806
See application file for complete search history.

(56) References Cited

U.S. PATENT DOCUMENTS 4,837,230 A * 6/1989 Chen ..................... C04B 35/185
442/178
5,225,283 A 7/1993 Leung et al.
(Continued)

FOREIGN PATENT DOCUMENTS

JP H10-130056 5/1998
JP 2007-119333 5/2007
(Continued)

OTHER PUBLICATIONS

Seyferth, Dietmar, "Preceramic Polymers: Past, Present and Future," *ACS Advances in Chemistry*, volume "Materials Chemistry: An Emerging Subdiscipline" (L. V. Interrante, L. Casper, A. Ellis, editors); Massachusetts Institute of Technology, Nov. 2, 1992, pp. 1-31.
(Continued)

*Primary Examiner* — Robert A Vetere
(74) *Attorney, Agent, or Firm* — Crowell & Moring LLP

(57) ABSTRACT

A method of producing a ceramic matrix composite including a protective ceramic coating thereon comprises applying a surface slurry onto an outer surface of an impregnated fiber preform. The surface slurry includes particulate ceramic solids dispersed in a flowable preceramic polymer comprising silicon, and the impregnated fiber preform comprises a framework of ceramic fibers loaded with particulate matter. The flowable preceramic polymer is cured, thereby forming on the outer surface a composite layer comprising a cured preceramic polymer with the particulate ceramic solids dispersed therein. The cured preceramic polymer is then pyrolyzed to form a porous ceramic layer comprising silicon carbide, and the impregnated fiber preform and the porous ceramic layer are infiltrated with a molten material comprising silicon. After infiltration, the molten material is
(Continued)

cooled to form a ceramic matrix composite body with a protective ceramic coating thereon.

18 Claims, 4 Drawing Sheets

Related U.S. Application Data

(60) Provisional application No. 62/589,181, filed on Nov. 21, 2017, provisional application No. 62/487,284, filed on Apr. 19, 2017.

(51) Int. Cl.
    *C04B 41/89* (2006.01)
    *C04B 35/573* (2006.01)
    *C04B 41/52* (2006.01)
    *C04B 35/571* (2006.01)
    *C04B 35/565* (2006.01)
    *C04B 35/52* (2006.01)
    *C04B 35/80* (2006.01)
    *C04B 35/515* (2006.01)
    *C04B 35/76* (2006.01)
    *C04B 38/06* (2006.01)

(52) U.S. Cl.
    CPC ........ *C04B 35/571* (2013.01); *C04B 35/573* (2013.01); *C04B 35/76* (2013.01); *C04B 35/80* (2013.01); *C04B 38/068* (2013.01); *C04B 41/009* (2013.01); *C04B 41/52* (2013.01); *C04B 41/89* (2013.01); *C04B 2235/3826* (2013.01); *C04B 2235/428* (2013.01); *C04B 2235/483* (2013.01); *C04B 2235/5244* (2013.01); *C04B 2235/5248* (2013.01); *C04B 2235/5252* (2013.01); *C04B 2235/5256* (2013.01); *C04B 2235/5436* (2013.01); *C04B 2235/616* (2013.01); *C04B 2237/30* (2013.01); *C04B 2237/365* (2013.01); *C04B 2237/368* (2013.01); *C04B 2237/38* (2013.01); *C04B 2237/385* (2013.01); *C04B 2237/403* (2013.01); *C04B 2237/61* (2013.01); *C04B 2237/704* (2013.01)

(56) References Cited

U.S. PATENT DOCUMENTS

| | | | | |
|---|---|---|---|---|
| 5,296,311 | A | * | 3/1994 | McMurtry ........ C04B 35/62857 428/688 |
| 5,562,966 | A | * | 10/1996 | Clarke ............. C04B 35/62855 428/524 |
| 6,548,130 | B1 | * | 4/2003 | Corman ................ C23C 16/045 428/408 |
| 6,723,382 | B2 | | 4/2004 | Yamaguchi et al. |
| 7,686,990 | B2 | | 3/2010 | Gray |
| 7,708,851 | B2 | | 5/2010 | Corman et al. |
| 2007/0092762 | A1 | | 4/2007 | Corman et al. |
| 2011/0268577 | A1 | * | 11/2011 | Bouillon ................. F01D 5/288 427/372.2 |
| 2013/0085057 | A1 | * | 4/2013 | Schmidt ............. C04B 41/4586 427/419.7 |
| 2014/0272249 | A1 | | 9/2014 | Lee et al. |
| 2016/0159066 | A1 | | 6/2016 | Landwehr et al. |
| 2016/0160664 | A1 | | 6/2016 | Luthra et al. |
| 2016/0326064 | A1 | | 11/2016 | Shim et al. |
| 2017/0044069 | A1 | | 2/2017 | Harris |

FOREIGN PATENT DOCUMENTS

| | | |
|---|---|---|
| JP | 2012-510890 | 5/2012 |
| JP | 2017-24978 | 2/2017 |

OTHER PUBLICATIONS

"Ceramic Forming Polymers," 2010-2017, Starfire® Systems, Sarnowski Drive, Glenville, NY 12302 (11 pages).

Official Office Action for corresponding Japanese Patent Application No. 2018-079603, dated May 8, 2019.

* cited by examiner

METHOD TO PROCESS A CERAMIC MATRIX COMPOSITE (CMC) WITH A PROTECTIVE CERAMIC COATING

RELATED APPLICATIONS

The present patent document is a division of U.S. patent application Ser. No. 15/956,097, filed Apr. 18, 2018, which claims the benefit of priority under 35 U.S.C. § 119(e) to U.S. Patent Application Ser. No. 62/589,181, filed on Nov. 21, 2017, and to U.S. Patent Application Ser. No. 62/487,284, filed on Apr. 19, 2017. All of the preceding applications are hereby incorporated by reference in their entirety.

TECHNICAL FIELD

The present disclosure is directed generally to the fabrication of ceramic matrix composites (CMCs) and more particularly to fabricating CMCs with a protective ceramic coating and optional surface layer.

BACKGROUND

Ceramic matrix composites, which include ceramic fibers embedded in a ceramic matrix, exhibit a combination of properties that make them promising candidates for industrial applications that demand excellent thermal and mechanical properties along with low weight, such as gas turbine engine components. CMCs may be fabricated by melt infiltration of a ceramic fiber preform. It may be beneficial to apply a surface layer on the composite to protect the fibers from physical and environmental damage during post-infiltration processing and use, such as during subsequent machining operations or when in service in a gas turbine engine.

BRIEF SUMMARY

A method of producing a ceramic matrix composite including a protective ceramic coating thereon is described herein.

The method comprises, according to a first embodiment, applying a surface slurry onto an outer surface of an impregnated fiber preform. The surface slurry includes particulate ceramic solids dispersed in a flowable preceramic polymer comprising silicon, and the impregnated fiber preform comprises a framework of ceramic fibers loaded with particulate matter. The flowable preceramic polymer is cured, thereby forming on the outer surface a composite layer comprising a cured preceramic polymer with the particulate ceramic solids dispersed therein. The cured preceramic polymer is then pyrolyzed to form a porous ceramic layer comprising silicon carbide, and the impregnated fiber preform and the porous ceramic layer are infiltrated with a molten material comprising silicon. After infiltration, the molten material is cooled to form a ceramic matrix composite body with a protective ceramic coating thereon.

According to a second embodiment, the method includes applying a surface slurry onto an outer surface of an impregnated fiber preform, where the surface slurry comprises particulate ceramic solids dispersed in a solvent, and the impregnated fiber preform comprises a framework of ceramic fibers loaded with particulate matter. The surface slurry is dried to form a dried porous layer comprising the particulate ceramic solids, and a flowable preceramic polymer comprising silicon is infiltrated into the dried porous layer. The flowable preceramic polymer is cured, thereby forming on the outer surface a composite layer comprising a cured preceramic polymer with the particulate ceramic solids dispersed therein. The cured preceramic polymer is then pyrolyzed to form a porous ceramic layer comprising silicon carbide, and the impregnated fiber preform and the porous ceramic layer are infiltrated with a molten material comprising silicon. After infiltration, the molten material is cooled to form a ceramic matrix composite body with a protective ceramic coating thereon.

DETAILED DESCRIPTION

An improved method of producing a ceramic matrix composite that is covered in full or in part by a protective ceramic coating has been developed. The method allows a dense ceramic coating to be formed that can protect the underlying ceramic fibers from damage during subsequent processing and may also impart environmental resistance to the ceramic matrix composite during service. The protective ceramic coating may include silicon carbide and optionally other ceramic phases with a minimal amount of free (unreacted) silicon. An outer layer may overlie the protective ceramic coating.

Figure 1:
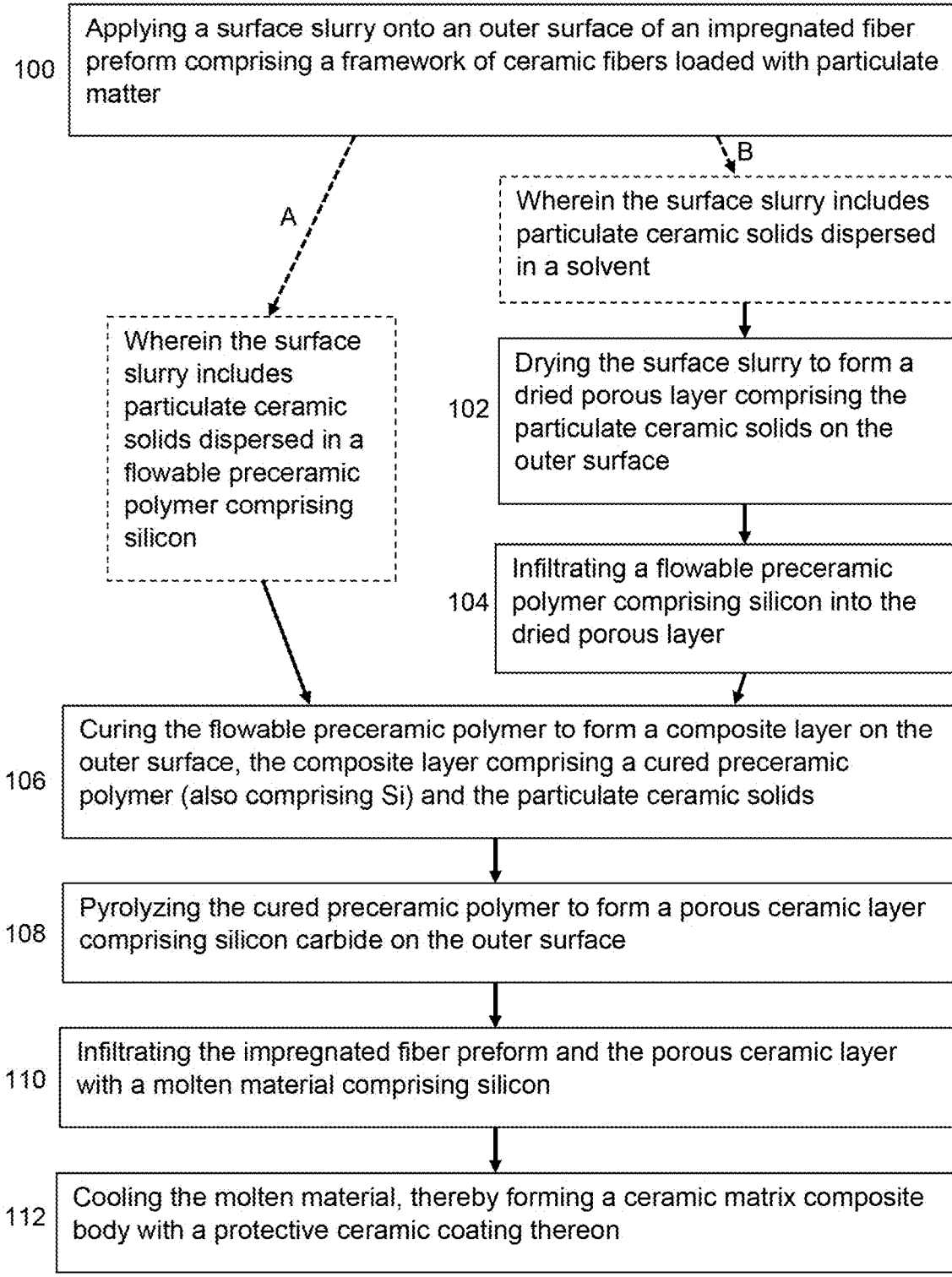
FIG. 1 is a flow diagram showing exemplary steps in the method according to one embodiment.

Referring to the flow chart of FIG. 1, the method entails applying 100 a first surface slurry onto an outer surface of an impregnated fiber preform comprising a framework of ceramic fibers loaded with particulate matter, such as silicon carbide or other ceramic particles. The framework may be, for example, a two- or three-dimensional weave of the ceramic fibers. The impregnated fiber preform may be formed prior to application of the first surface slurry using fiber assembly and slurry infiltration processes known in the art.

The first surface slurry may include, in one example ("example A"), particulate ceramic solids dispersed in a flowable preceramic polymer comprising silicon. In another example ("example B"), the first surface slurry may include particulate ceramic solids dispersed in an aqueous or organic solvent. In the latter case, after application to the outer surface, the first surface slurry may be dried 102 to form a dried porous layer comprising the particulate ceramic solids on the outer surface, where the drying 102 of the first surface slurry entails removing (e.g., evaporating) the solvent. A flowable preceramic polymer comprising silicon may then be infiltrated 104 into the dried porous layer. The flowable preceramic polymer of example A and example B may comprise an organosilicon polymer and/or an inorganic silicon polymer. Generally speaking, a preceramic polymer comprising silicon may be understood to be a polymer that includes the chemical element silicon (Si). Typically, the flowable preceramic polymer has a viscosity in a range from about 10 cp to about 1000 cp to facilitate coating and infiltration.

Referring again to the flow diagram of FIG. 1, the flowable preceramic polymer may be cured 106 to form a composite layer including the particulate ceramic solids dispersed in a cured preceramic polymer that comprises silicon. After curing 106, the cured preceramic polymer may be pyrolyzed 108 to form a porous ceramic layer comprising silicon carbide on the outer surface. The porous ceramic layer may also include other ceramic phases, in addition to silicon carbide. The flowable preceramic polymer employed in the method may be selected to obtain the desired ceramic phase(s) after curing 106 and pyrolysis 108. In one example, the flowable preceramic polymer may include polycarbosilane and/or polysiloxane, as these may be converted to silicon carbide upon heating to a suitable pyrolysis temperature.

After pyrolysis 108, the impregnated fiber preform and the porous ceramic layer on the outer surface thereof may be infiltrated 110 with a molten material comprising silicon in order to densify the composite. During melt infiltration, molten material flows through the porous ceramic layer and the impregnated fiber preform and reacts with any reactive elements in the flow path. Upon cooling 112 of the melt, the infiltrated porous ceramic layer becomes a dense ceramic coating that includes one or more ceramics, such as one or more carbides, nitrides, silicides and/or borides. Thus, a ceramic matrix composite body with a protective ceramic coating thereon is formed. The ceramic matrix and protective ceramic coating include: (a) ceramic reaction products resulting from the reaction between the molten material and any reactive element(s) in the fiber preform or porous ceramic layer; and (b) any ceramic phases (e.g., SiC particles) present prior to melt infiltration. The ceramic matrix and protective ceramic coating may include a residual amount of unreacted metal, typically silicon or a silicon alloy, and there may also be a residual amount of carbon. Preferably, there is no more than about 30 vol. %, no more than about 20 vol. %, or no more than about 10 vol. % unreacted metal or residual carbon. Ideally, the amount of unreacted metal or residual carbon is no greater than about 5 vol. %. The protective ceramic coating may be machined if needed to adjust the thickness of the coating or shape of the part.

Figure 2:
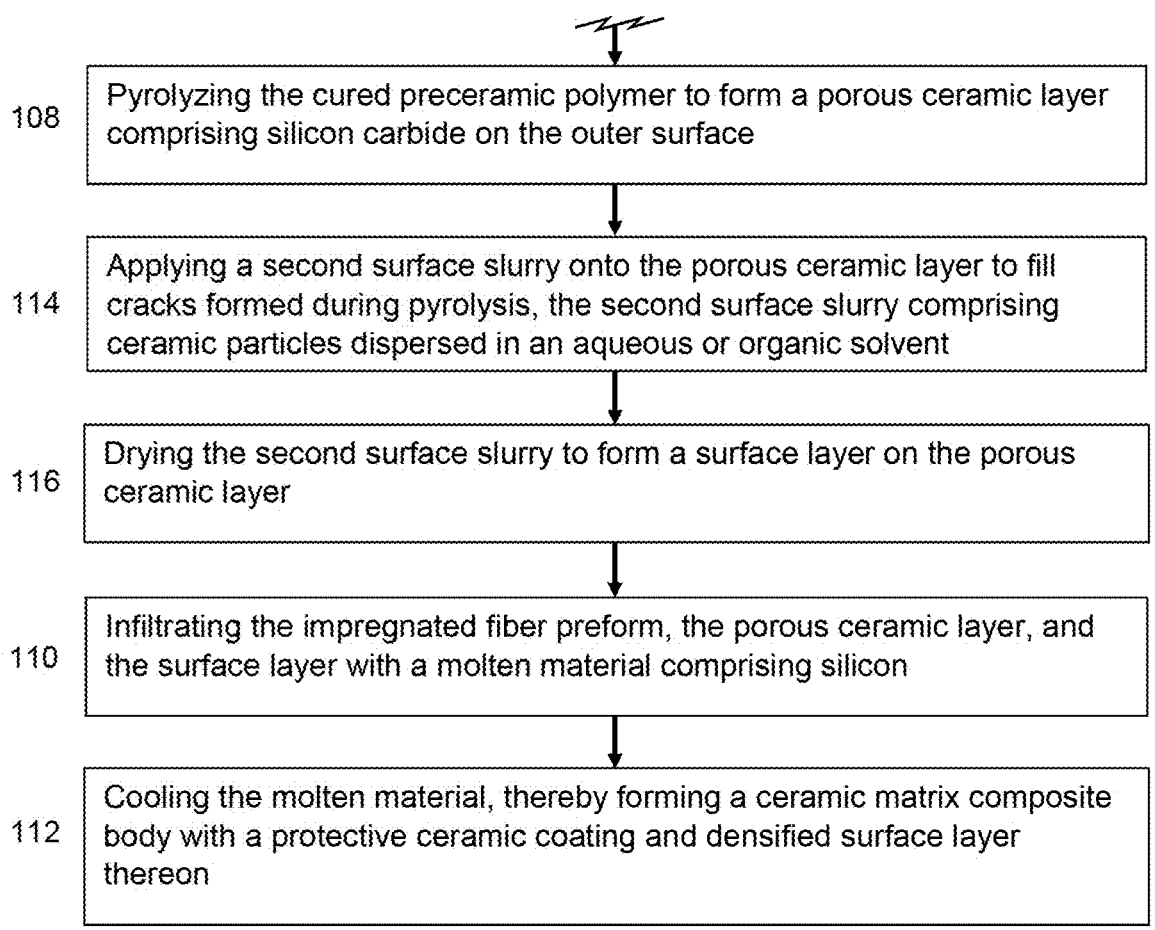
FIG. 2 is a flow diagram showing exemplary steps in the method according to another embodiment.
Figure 3:
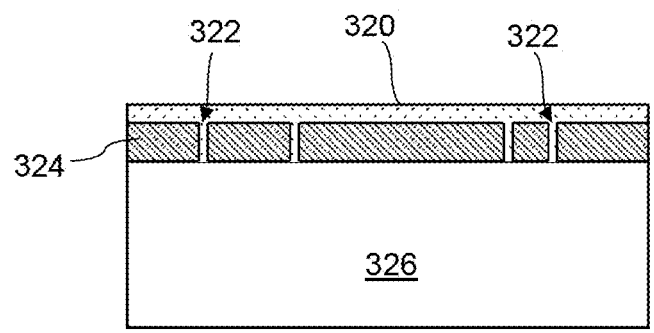
FIG. 3 is a schematic illustrating how a surface layer formed from a second surface slurry can penetrate pyrolysis cracks in the porous ceramic layer overlying the impregnated fiber preform.

The flow chart of FIG. 2 shows another embodiment where, after pyrolysis 108 and prior to melt infiltration 110, a second surface slurry is applied 114 to the porous ceramic layer to fill cracks that may have formed during pyrolysis 108. (It is understood that the method may proceed according to the steps described above and shown in the flow chart of FIG. 1 through the pyrolysis step 108.) The second surface slurry may include ceramic particles and optionally one or more reactive elements dispersed in an aqueous or organic solvent. The second surface slurry is designed to have a viscosity which permits permeation of any pyrolysis cracks. The viscosity of the second surface slurry increases with solids loading, and thus the solids loading is maintained below about 60 or 70 vol. %. After application 114 to the porous ceramic layer, the second surface slurry is dried 116 to form a surface layer on the porous ceramic layer. As can be seen in the schematic of FIG. 3, the surface layer 320 formed from the second surface slurry penetrates pyrolysis cracks 322 in the porous ceramic layer 324 overlying the impregnated fiber preform 326. Typically, the surface layer has a thickness from about 0.03 mm to about 0.3 mm. Together, the surface layer and the porous ceramic layer may have a thickness from about 0.08 mm to about 1.3 mm.

After infiltration 110 of the preform with the molten material and cooling 112 thereof, the surface layer becomes a densified surface layer on the protective ceramic coating. The densified surface layer may include (a) ceramic reaction products resulting from the reaction between the molten material and any reactive element(s) in the surface layer; and (b) any ceramic phases (e.g., SiC particles) present in the surface layer prior to melt infiltration. The densified surface layer may contain a higher amount of residual silicon than the protective ceramic coating. It is also contemplated that the densified surface layer may have a multilayer structure comprising sublayers with different residual silicon contents, thereby forming a gradual or stepped gradient in residual silicon concentration across the densified surface layer. Having a densified surface layer with a higher residual silicon content (i.e., less silicon carbide) than the underlying protective ceramic coating may help to enhance surface machinability and also reduce residual tensile stresses caused by CTE (coefficient of thermal expansion) mismatch between the protective ceramic coating and the ceramic matrix composite body. Reducing the residual tensile stress can lead to better mechanical properties, and ensuring the integrity of the protective ceramic coating with a crack-filling surface layer may enhance the resistance of the composite body to environmetal degradation.

The method may also entail, prior to applying the first surface slurry to the outer surface of the impregnated fiber preform, placing a carbon fiber mat or veil onto the outer surface. In this case, application of the first surface slurry to the outer surface may include spreading or depositing the first surface slurry over the carbon fiber mat such that infiltration with the first surface slurry occurs. Suitable carbon fiber mats or veils are very thin (e.g., about 0.1 mm in thickness) and typically comprise a random arrangement of carbon fibers constrained with a polymeric binder. Such carbon fiber products are commercially available from various vendors.

The carbon fiber veil may become embedded in the cured preceramic polymer during curing, as discussed further below. When melt infiltration is carried out after pyrolysis of the preceramic polymer to form the porous ceramic layer, carbon from the carbon fiber veil may act as a reactive element in the porous ceramic layer, promoting formation of silicon carbide from the molten silicon or silicon alloy as it infiltrates therethrough.

The ceramic fibers that serve as the framework of the impregnated fiber preform typically comprise silicon carbide, but may also or alternatively comprise another ceramic, such as silicon nitride, alumina, aluminosilicate, or carbon. The particulate matter contained in the impregnated fiber preform includes ceramic particles that become part of the ceramic matrix after melt infiltration. Typically, these ceramic particles comprise silicon carbide, but they may also or alternatively include silicon nitride, alumina, aluminosilicate, and/or boron carbide or another refractory carbide. In a preferred embodiment, the ceramic fibers comprise silicon carbide, and the ceramic particles (and ultimately the ceramic matrix) also comprise silicon carbide. The ceramic matrix composite that is formed in this case may be referred to as a silicon carbide/silicon carbide or SiC/SiC composite.

The particulate ceramic solids used to form the porous ceramic layer on the outer surface of the impregnated fiber preform may include the same or different ceramic particles as contained in the fiber preform. Typically, the ceramic particles of the porous ceramic layer also comprise silicon carbide. As used herein, the term "silicon carbide" refers broadly to the compound SiC as well as to other silicon-containing carbides.

As indicated above, the impregnated fiber preform may be formed by a slurry infiltration process known in the art prior to the application of the first surface slurry. Slurry infiltration may entail infiltrating a slurry composition comprising a solvent and the particulate matter (and optionally reactive elements) into a fiber preform comprising the framework of fibers, followed by drying the remove the solvent. It is contemplated that application of the first surface slurry may occur prior to slurry infiltration, in which case the first surface slurry may be applied to a fiber preform that is not (yet) impregnated with particulate matter. Slurry infiltration may further be preceded by a chemical vapor infiltration process and by construction of the fiber preform using fiber assembly methods known in the art.

The first surface slurry of example A may be prepared by mixing together a flowable preceramic polymer comprising silicon, such as polycarbosilane and/or polysiloxane, and particulate ceramic solids, such as silicon carbide and/or silicon nitride particles. Typical particle sizes are in a range from about 1 micron to about 30 microns. The surface slurry may further comprise one or more reactive elements that may promote formation of the desired ceramic phase(s) during melt infiltration, such as carbon (e.g., carbon black, graphite and/or diamond) and/or a refractory metal (e.g., molybdenum and/or tungsten). Typically, the first surface slurry has a solids loading from about 5 vol. % to about 60 vol. %. The first surface slurry may be deposited or spread onto the outer surface of the fiber preform by a coating method such as dip coating, solution casting, spray coating and/or brushing. The application of the first surface slurry to the outer surface is typically carried out at room temperature (e.g., from about 15° C. to about 25° C.).

The first surface slurry of example B may be prepared by mixing together an aqueous or organic solvent and particulate ceramic solids, such as silicon carbide and/or silicon nitride particles. Typical particle sizes are in a range from about 1 micron to about 30 microns. One or more reactive elements as described above may also be included in the first surface slurry, and the first surface slurry may have a solids loading from about 20 vol. % to about 75 vol. %. The aqueous or organic solvent employed for the surface slurry may be selected from water, ethanol, methanol, isopropyl alcohol, methyl ethyl ketone, and/or toluene. The first surface slurry may further include a binder, such as polyethylene glycol, acrylate co-polymers, latex co-polymers, and/or polyvinyl butyral, and/or a dispersant, such as ammonium polyacrylate, polyvinyl butyral, a phosphate ester, polyethylene imine, or BYK® 110 (Byk USA, Wallingford, CT). The application of the first surface slurry to the outer surface of the fiber preform is typically carried out at room temperature (e.g., from about 15° C. to about 25° C.). The drying of the first surface slurry to form the dried porous layer may be carried out at room temperature or at an elevated temperature (e.g., from about 40° C. to about 150° C.) in an ambient or controlled environment, such as under vacuum conditions or in an inert gas atmosphere. Drying may take place over a time duration from about 2 hours to about 24 hours. Infiltration with the flowable preceramic polymer comprising silicon may entail depositing or spreading the flowable preceramic polymer on the dried porous layer such that infiltration may occur.

Similar to the first surface slurry employed in example B, the second surface slurry may be prepared by mixing together an aqueous or organic solvent and ceramic particles (e.g., the particulate ceramic solids mentioned above), such as silicon carbide and/or silicon nitride particles. Typical particle sizes are in a range from about 1 micron to about 30 microns. One or more reactive elements as described above (e.g., graphite, diamond, carbon black, molybdenum, and/or tungsten) may also be included in the second surface slurry. The second surface slurry may have a solids loading from about 10 vol. % to about 70 vol. %, and more typically from about 30 vol. % to about 60 vol. %. The aqueous or organic solvent employed for the surface slurry may be selected from water, ethanol, methanol, isopropyl alcohol, methyl ethyl ketone, and/or toluene. The second surface slurry may further include a binder, such as polyethylene glycol, acrylate co-polymers, latex co-polymers, and/or polyvinyl butyral, and/or a dispersant, such as ammonium polyacrylate, polyvinyl butyral, a phosphate ester, polyethylene imine, or BYK® 110 (Byk USA, Wallingford, CT). The application of the second surface slurry onto the porous ceramic layer is typically carried out at room temperature (e.g., from about 15° C. to about 25° C.). The drying of the second surface slurry to form the surface layer may be carried out at room temperature or at an elevated temperature (e.g., from about 40° C. to about 150° C.) in an ambient or controlled environment, such as under vacuum conditions or in an inert gas atmosphere. Drying may take place over a time duration from about 2 hours to about 24 hours.

The first and/or second surface slurry may be applied to only a portion of or to an entirety of the outer surface (e.g., to a single surface or to multiple surfaces), such that the protective coating and/or surface layer formed from the method covers part or all of the impregnated fiber preform. After application, any excess surface slurry or preceramic polymer may be removed from the outer surface.

Curing of the flowable preceramic polymer to form the composite layer may entail heating at a temperature in a range from about 150° C. to about 400° C.; more typically, curing is carried out at a curing temperature in a range from about 200° C. to about 250° C. It is also contemplated that the curing may be activated by light (e.g., ultraviolet radiation) or a chemical curing agent.

In one example, curing may entail applying heat and pressure to the preceramic polymer-coated preform using, for example, a compression molding process, where the coated preform is hot pressed in an apparatus such as a die or mold. The curing may also or alternatively involve high temperature vacuum bagging. Typically, curing is carried out for a time duration from about 1 minute to about 120 minutes to form the composite layer, which includes particulate ceramic solids dispersed in the cured preceramic polymer, and which may further include, in some embodiments, an embedded carbon fiber veil.

Pyrolysis of the cured preceramic polymer may be carried out by heating the composite layer to a temperature in a range from about 850° C. to about 1300° C. The result is a porous ceramic layer on the outer surface of the impregnated fiber preform that typically has a thickness in a range from about 0.05 mm to about 1 mm. The porous ceramic layer includes the particulate ceramic solids (e.g., silicon carbide particles) incorporated into the original surface slurry formulation as well as ceramic phase(s) formed by pyrolyzing the cured preceramic polymer. Suitable ceramic phases may include, for example, silicon carbide and/or silicon nitride.

Typically, the pyrolysis is conducted in an inert gas and/or a vacuum environment, such as a vacuum chamber that has been evacuated and backfilled with a desired pressure of inert gas (e.g., argon, helium and/or nitrogen). Pyrolysis may alternatively be conducted in a reactive gas environment in which the gas is suitably chosen to enhance formation of the desired ceramic phase(s). The porous ceramic layer formed by pyrolysis may also include carbon or other reactive elements, and may have a higher solids fraction (including particulate ceramic solids, ceramic phases formed by pyrolysis and reactive elements) than the interior of the impregnated fiber preform, due at least in part to the use of the preceramic polymer. For example, the solids loading in the porous ceramic layer may be from about 50 vol. % to about 95 vol. %, with a remainder of the volume being porosity.

The porous ceramic layer may be machined either before or after melt infiltration. It may be advantageous to machine the porous ceramic layer prior to infiltration, since the porous ceramic layer can be more readily machined in the green state. It may further be advantageous to carry out any machining or grit blasting on the surface layer formed from the second surface slurry, when present. Machining may allow for control over not only the thickness of the porous layer or the surface layer, but also over the surface finish.

The temperature at which melt infiltration is carried out to densify the fiber preform, the porous ceramic layer, and optional surface layer depends on the metal or alloy forming the melt. In the case of silicon, which has a melting temperature ($T_m$) of 1414° C., the temperature may be from about 1410° C. to about 1500° C. Generally speaking, the temperature for melt infiltration is at or above $T_m$ of the metal or alloy. Typically, melt infiltration is carried out for a time duration of several minutes to hours, depending in part on the size and complexity of the component. Upon cooling of the molten material, a ceramic matrix composite body with a protective ceramic coating and optional densified surface layer thereon is formed. The composite body includes ceramic fibers dispersed in a ceramic matrix and contains an amount of residual metal or carbon of about 30 vol. % or less (preferably 20 vol. % or less, 10 vol. % or less, or 5 vol. % or less). In one example, the composite body includes silicon carbide fibers embedded in a silicon carbide matrix, and the residual metal is silicon. The matrix of the composite body may also or alternatively comprise other ceramic phases, as indicated above. Similarly, the protective ceramic coating on the composite body may comprise silicon carbide and/or another ceramic, as well as some amount of residual silicon. Depending on the application, an additional environmental barrier coating may be applied to the CMC body over the protective ceramic coating and/or the densified surface layer. The CMC body having the protective ceramic coating and optional densified surface layer may be used as a gas turbine engine component (e.g., seal segment, blade, vane or combustor liner) or for another high temperature application.

Example 1

Figure 4:
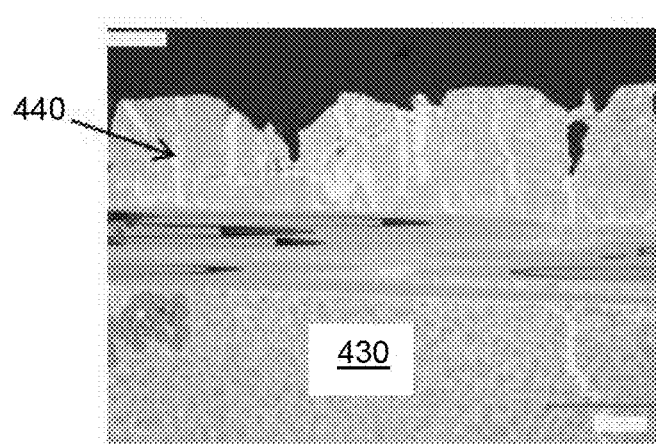
FIG. 4 is an optical image showing a cross-section of an exemplary ceramic matrix composite body including a protective ceramic coating prepared according to one embodiment of the method.

An impregnated fiber preform comprising a framework of SiC fibers loaded with SiC particles is formed by fiber assembly and slurry infiltration methods known in the art. After slurry infiltration, a carbon fiber veil is cut to fit a first surface of the impregnated fiber preform, which in this example is a panel of approximately 5 cm by 15 cm in size, and the carbon fiber veil is applied to the first surface. The thickness of the carbon fiber veil is approximately 0.13 mm. A surface slurry is formed by mixing polycarbosilane with SiC particles of about 3.5 microns in nominal size. The mixing is carried out in a ball mill for about 4 hours using SiC balls. After complete mixing has taken place, the surface slurry is applied to the surface of the fiber preform by spreading over the carbon fiber veil, and any excess surface slurry is removed. The fiber preform is flipped over to the other side, exposing a second surface of the fiber preform, and the process is repeated, including applying a carbon fiber veil to the second surface, applying the surface slurry formulation over the carbon fiber veil, and then removing any excess surface slurry. After coating with the surface slurry, the coated preform is placed between steel plates and hot-pressed in air at a temperature of 230° C. for one hour, which leads to "press-curing" of the surface slurry formulation to form a composite layer that includes the SiC particles and carbon fiber veil in a cured polycarbosilane matrix. After curing, the coated preform is heated at a temperature of 1000° C. for one hour in a controlled environment (e.g., in a partial pressure of argon), to pyrolyze the cured polycarbosilane, thereby forming a porous ceramic coating including carbon (from the carbon fiber veil) on the impregnated fiber preform. After pyrolysis, the impregnated fiber preform and the overlying coating are infiltrated with a melt comprising silicon at a temperature at or above the melting temperature ($T_m$) of silicon, and thus a densified ceramic matrix composite body and protective ceramic coating are formed. A cross-sectional view of the CMC body 430 and protective ceramic coating 440 formed as described above are shown in the image of FIG. 4.

Example 2

Figure 5:
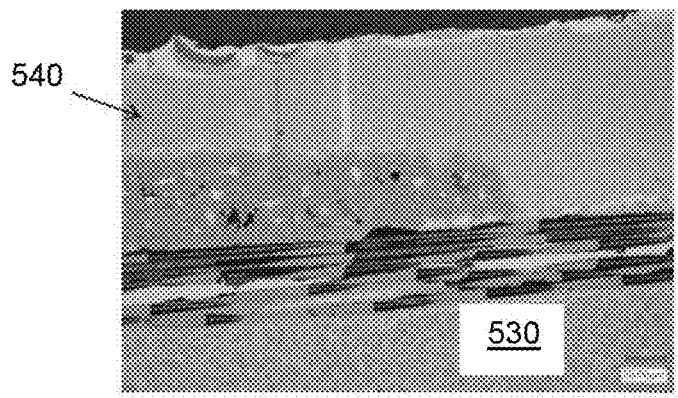
FIG. 5 is an optical image showing a cross-section of an exemplary ceramic matrix composite body including a protective ceramic coating prepared according to another embodiment of the method.

An impregnated fiber preform comprising a framework of SiC fibers loaded with SiC particles is formed by fiber assembly and slurry infiltration methods known in the art. After slurry infiltration of the fiber preform, a surface slurry is formed by mixing water with SiC particles of about 3.5 microns in nominal size. As in the preceding example, the mixing may be carried out in a ball mill for about 4 hours using SiC balls. A binder, dispersant and/or reactive element (s) may also be included in the surface slurry. The solids loading in this example is about 20 vol. %. After complete mixing has taken place, the surface slurry is applied to the surface of the impregnated fiber preform and dried to form a dried porous layer of SiC particles. Next, polycarbosilane is deposited on the dried porous layer to soak into or infiltrate spaces between the SiC particles, excess polycarbosilane is removed, and a composite layer comprising cured polycarbosilane and the particulate SiC solids is formed upon heating at 230° C. for one hour. After curing, the composite layer is heated at a temperature of 1000° C. for one hour in a controlled environment (e.g., in a partial pressure of argon), to pyrolyze the cured polycarbosilane and form a porous ceramic coating on the impregnated fiber preform. After pyrolysis, the fiber preform and the overlying porous coating are infiltrated with a melt comprising silicon at a temperature at or above the melting temperature ($T_m$) of silicon, and thus a densified ceramic matrix composite body and protective ceramic coating are formed. A cross-sectional view of the CMC body 530 and protective ceramic coating 540 are shown in the image of FIG. 5.

Example 3

Figure 6:
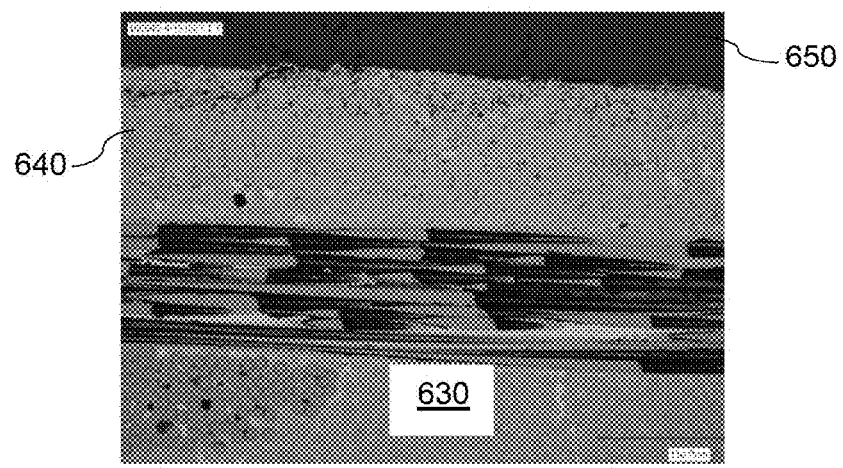
FIG. 6 is an optical image showing a cross-section of an exemplary ceramic matrix composite body including a protective ceramic coating and surface layer thereon prepared according to another embodiment of the method.

6.3 g of SMP-500 (Starfire® Systems) is thoroughly mixed with 3 g of SiC powder. The resulting polymer/SiC slurry mixture ("first surface slurry") is impregnated into a carbon veil of 0.005" in thickness and applied on both sides of a slurry-infiltrated 2"×6" fiber preform. The slurry-coated impregnated fiber preform is placed between stainless tools and the first surface slurry is cured at 230° C. to form a composite layer on both sides of the preform. The composite layer is then pyrolyzed at 1300° C. in vacuum with a partial Ar atmosphere to form a porous ceramic layer on the preform. A second surface slurry comprising SiC particles, dispersant, binder, and water is prepared and vacuum infiltrated into the porous ceramic layer to fill any pyrolysis cracks. Upon drying, the second surface slurry forms a surface layer that may undergo polishing (e.g., with 220 grit sand paper) prior to melt infiltration. The optical micrograph of FIG. 6 shows a typical microstructure of the resulting densified surface layer 650 on the protective ceramic coating 640, which overlies the CMC body 630. No significant pyrolysis cracks are observed.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

Although considerable detail with reference to certain embodiments has been described, other embodiments are possible. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages, and it is not necessarily expected that all of the described advantages will be achieved with every embodiment.

The invention claimed is:

1. A method of producing a ceramic matrix composite having a protective ceramic coating, the method comprising:
    applying a first surface slurry onto an outer surface of an impregnated fiber preform comprising a framework of ceramic fibers loaded with particulate matter, the first surface slurry comprising particulate ceramic solids dispersed in a solvent;
    drying the first surface slurry to form a dried porous layer comprising the particulate ceramic solids;
    infiltrating a flowable preceramic polymer comprising silicon into the dried porous layer;
    curing the flowable preceramic polymer to form a composite layer on the outer surface, the composite layer comprising a cured preceramic polymer with the particulate ceramic solids dispersed therein;
    pyrolyzing the cured preceramic polymer to form a porous ceramic layer comprising silicon carbide on the outer surface;
    applying a second surface slurry onto the porous ceramic layer to fill cracks formed during pyrolysis, the second surface slurry comprising ceramic particles dispersed in an aqueous or organic solvent;
    drying the second surface slurry to form a surface layer on the porous ceramic layer;
    infiltrating the impregnated fiber preform, the porous ceramic layer, and the surface layer with a molten material comprising silicon; and
    after infiltration with the molten material, cooling the molten material to form a ceramic matrix composite body with a protective ceramic coating thereon and with a densified surface layer on the protective ceramic coating,
    wherein the densified surface layer comprises a higher amount of residual silicon than the protective ceramic coating.

2. The method of claim 1, wherein curing the flowable preceramic polymer comprises heating at a temperature in a range from about 150° C. to about 400° C., and
    wherein the pyrolyzing comprises heating the composite layer to a temperature in a range from about 850° C. to about 1300° C.

3. The method of claim 2, wherein the curing further comprises applying pressure.

4. The method of claim 1, wherein the flowable preceramic polymer comprises an organosilicon polymer and/or an inorganic silicon polymer.

5. The method of claim 1, wherein the flowable preceramic polymer has a viscosity in a range from about 10 cp to about 1000 cp.

6. The method of claim 1, wherein the porous ceramic layer includes other ceramic phases in addition to silicon carbide.

7. The method of claim 1, further comprising machining the surface layer prior to the infiltration.

8. The method of claim 1, wherein the surface layer has a thickness from about 0.03 mm to about 0.3 mm.

9. The method of claim 1, wherein the surface layer and the porous ceramic layer together have a thickness from about 0.08 mm to about 1.3 mm.

10. The method of claim 1, wherein the second surface slurry comprises a solids loading from about 10 vol. % to about 70 vol. %.

11. The method of claim 1, wherein the ceramic particles comprise silicon carbide and/or silicon nitride, and
    wherein the second surface slurry further comprises one or more reactive elements selected from the group consisting of: graphite, diamond, carbon black, molybdenum, and tungsten.

12. The method of claim 11, wherein the densified surface layer comprises:
    ceramic reaction products from reactions between the molten material and the one or more reactive elements in the surface layer; and
    the silicon carbide and any other ceramic phases present in the surface layer prior to the infiltration.

13. The method of claim 1, wherein the densified surface layer has a multilayer structure comprising sublayers with different residual silicon contents.

14. The method of claim 1, further comprising, prior to applying the first surface slurry to the outer surface of the impregnated fiber preform, placing a carbon fiber mat onto the outer surface.

15. The method of claim 1, further comprising, prior to the infiltration, machining the porous ceramic layer.

16. The method of claim 1, wherein the ceramic matrix composite body comprises silicon carbide fibers embedded in a silicon carbide matrix, and
    wherein the protective ceramic coating comprises silicon carbide with 20 vol. % or less residual silicon.

17. A method of producing a ceramic matrix composite having a protective ceramic coating, the method comprising:
- applying a first surface slurry onto an outer surface of an impregnated fiber preform comprising a framework of ceramic fibers loaded with particulate matter, the first surface slurry comprising particulate ceramic solids dispersed in a solvent;
- drying the first surface slurry to form a dried porous layer comprising the particulate ceramic solids;
- infiltrating a flowable preceramic polymer comprising silicon into the dried porous layer;
- curing the flowable preceramic polymer to form a composite layer on the outer surface, the composite layer comprising a cured preceramic polymer with the particulate ceramic solids dispersed therein;
- pyrolyzing the cured preceramic polymer to form a porous ceramic layer comprising silicon carbide on the outer surface;
- applying a second surface slurry onto the porous ceramic layer to fill cracks formed during pyrolysis, the second surface slurry comprising ceramic particles dispersed in an aqueous or organic solvent;
- drying the second surface slurry to form a surface layer on the porous ceramic layer;
- infiltrating the impregnated fiber preform, the porous ceramic layer, and the surface layer with a molten material comprising silicon; and
- after infiltration with the molten material, cooling the molten material to form a ceramic matrix composite body with a protective ceramic coating thereon and with a densified surface layer on the protective ceramic coating,
wherein the densified surface layer has a multilayer structure comprising sublayers with different residual silicon contents.

18. A method of producing a ceramic matrix composite having a protective ceramic coating, the method comprising:
- applying a first surface slurry onto an outer surface of an impregnated fiber preform comprising a framework of ceramic fibers loaded with particulate matter, the first surface slurry comprising particulate ceramic solids dispersed in a solvent comprising water, ethanol, methanol, isopropyl alcohol, methyl ethyl ketone, and/or toluene;
- drying the first surface slurry to evaporate the solvent and form a dried porous layer comprising the particulate ceramic solids;
- infiltrating a flowable preceramic polymer comprising silicon into the dried porous layer;
- curing the flowable preceramic polymer to form a composite layer on the outer surface, the composite layer comprising a cured preceramic polymer with the particulate ceramic solids dispersed therein;
- pyrolyzing the cured preceramic polymer to form a porous ceramic layer comprising silicon carbide on the outer surface;
- infiltrating the impregnated fiber preform and the porous ceramic layer on the outer surface thereof with a molten material comprising silicon; and
- after infiltration with the molten material, cooling the molten material to form a ceramic matrix composite body with a protective ceramic coating thereon.

* * * * *